(12) United States Patent
Glowacki et al.

(10) Patent No.: US 6,802,780 B2
(45) Date of Patent: Oct. 12, 2004

(54) SEAL FOR DOUBLE-TUBE DRIVESHAFT

(75) Inventors: Maciej Glowacki, West Bloomfield, MI (US); Walter J. Golembiewski, Washington, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/024,969

(22) Filed: Dec. 19, 2001

(65) Prior Publication Data

US 2002/0132675 A1 Sep. 19, 2002

Related U.S. Application Data

(60) Provisional application No. 60/276,429, filed on Mar. 15, 2001.

(51) Int. Cl.[7] ............................... F16C 3/03; F16J 15/50
(52) U.S. Cl. ........................ 464/162; 277/345; 277/912
(58) Field of Search ................................ 464/162, 175, 464/173, 157, 158, 16; 277/912, 345, 634, 635, 636

(56) References Cited

U.S. PATENT DOCUMENTS

| | | | |
|---|---|---|---|
| 1,541,007 A | | 6/1925 | Thiemer |
| 1,949,500 A | | 3/1934 | Swenson |
| 1,950,579 A | | 3/1934 | Swenson |
| 2,510,362 A | | 6/1950 | Anderson |
| 2,769,457 A | | 11/1956 | Wittenberg |
| 3,063,266 A | * | 11/1962 | Rabson ...................... 464/174 |
| 3,454,182 A | | 7/1969 | Morton |
| 3,813,899 A | | 6/1974 | Abrahamer |
| 3,942,336 A | | 3/1976 | Schultenkamper |
| 4,003,219 A | | 1/1977 | Stull |
| 4,084,536 A | | 4/1978 | Stansbury |
| 4,153,260 A | * | 5/1979 | Joyner ...................... 277/500 |
| 4,215,869 A | * | 8/1980 | Pendleton ...................... 277/345 |
| 4,308,729 A | | 1/1982 | Condon |
| 4,416,445 A | | 11/1983 | Coad |
| 4,453,723 A | * | 6/1984 | Greenwald ...................... 277/618 |
| 4,460,182 A | * | 7/1984 | Brissette ...................... 277/345 |
| 4,508,522 A | | 4/1985 | Numazawa et al. |
| 4,516,959 A | | 5/1985 | Krude |
| 4,529,213 A | | 7/1985 | Goodman |
| 4,582,484 A | | 4/1986 | Sandor |
| 4,819,755 A | | 4/1989 | Smemo et al. |
| 4,895,391 A | | 1/1990 | Groat |
| 4,945,745 A | | 8/1990 | Bathory et al. |

(List continued on next page.)

FOREIGN PATENT DOCUMENTS

| | | |
|---|---|---|
| DE | 1 475 963 | 2/1965 |
| FR | 1 237 637 | 10/1959 |
| FR | 1 417 355 | 10/1964 |

*Primary Examiner*—David Bagnell
*Assistant Examiner*—K. Thompson
(74) *Attorney, Agent, or Firm*—Brinks Hofer Gilson & Lione

(57) ABSTRACT

A seal system and method are provided to protect a double-tube vehicle driveshaft, having first and second members containing intermeshing splined portions, from premature wear or corrosion. The seal system comprises first and second splined inner-portions wherein the diameter of the first splined inner-portion is greater than the diameter of the second splined inner-portion. In operation, at least a part of the splined portion of the first member is resident within the first splined inner-portion of the seal, and at least a part of the splined portion of the second member is telescopically resident within the second splined inner-portion of the seal. The seal method comprises fitting the first splined inner-portion of the seal around at least a part of the splined portion of the first member, and fitting the second splined inner-portion of the seal around at least a part of the splined portion of the second member.

19 Claims, 7 Drawing Sheets

U.S. PATENT DOCUMENTS

| | | | |
|---|---|---|---|
| 4,957,459 A | 9/1990 | Snyder | |
| 5,027,784 A | 7/1991 | Osawa et al. | |
| 5,230,658 A | 7/1993 | Burton | |
| 5,299,982 A | 4/1994 | Burton | |
| 5,342,282 A | 8/1994 | Letourneur | |
| 5,419,741 A | 5/1995 | Schwärzler | |
| 5,525,112 A * | 6/1996 | Smith | 464/162 |
| 5,655,968 A | 8/1997 | Burton | |
| 5,716,276 A | 2/1998 | Mangas et al. | |
| 5,752,866 A | 5/1998 | Takahashi et al. | |
| 5,772,520 A | 6/1998 | Nicholas et al. | |
| 5,836,824 A | 11/1998 | Konegen et al. | |
| 5,845,911 A | 12/1998 | Gimino | |
| 5,904,622 A | 5/1999 | Breese et al. | |
| 5,931,738 A | 8/1999 | Robb | |
| 5,961,388 A | 10/1999 | Breidenbach et al. | |
| 6,023,830 A | 2/2000 | Cole et al. | |
| 6,123,622 A | 9/2000 | Mikeska et al. | |
| 6,159,104 A | 12/2000 | Mikeska et al. | |
| 6,179,717 B1 | 1/2001 | Schwarzler | |
| 6,193,612 B1 * | 2/2001 | Craig et al. | 464/162 |
| 6,195,991 B1 | 3/2001 | De Shon | |
| 6,279,221 B1 | 8/2001 | Glowacki et al. | |
| 6,394,463 B1 * | 5/2002 | Otani | 277/502 |
| 6,516,829 B1 | 2/2003 | Townsend et al. | |

* cited by examiner

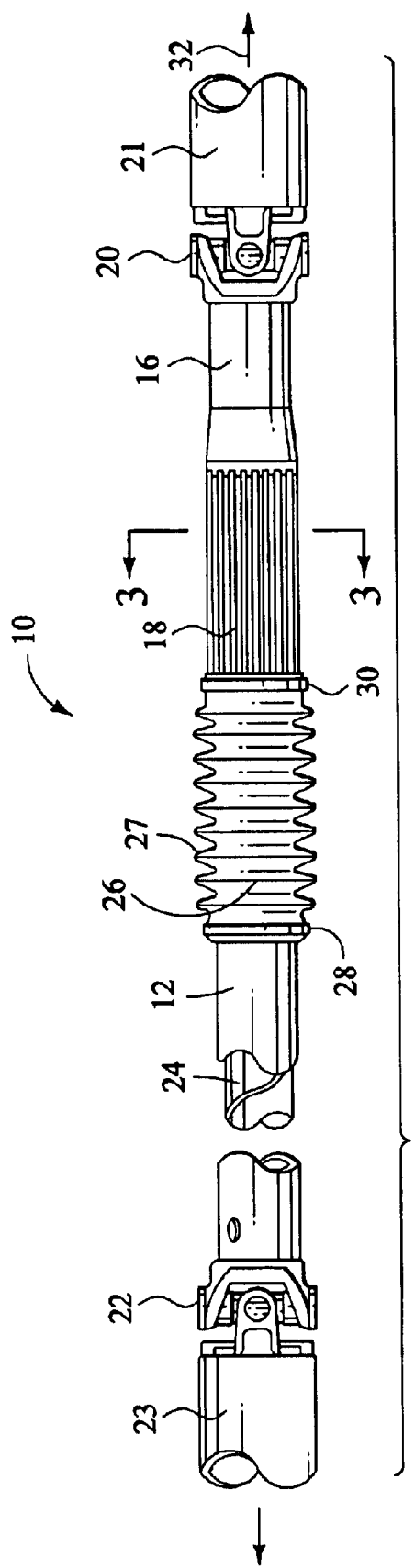
FIG. 2 PRIOR ART
FIG. 4 PRIOR ART
FIG. 3 PRIOR ART

SEAL FOR DOUBLE-TUBE DRIVESHAFT

RELATED APPLICATIONS

This application claims priority to U.S. Provisional Patent Application No. 60/276,429, filed Mar. 15, 2001, the entirety of which is hereby incorporated herein by reference.

BACKGROUND OF THE INVENTION

Seals for protecting driveshafts have long been known in the art. Such seals are necessary to prevent external elements, such as, water, dirt, or salt from intruding into the driveshaft, thereby causing premature wear or corrosion of the system, and system dynamic imbalance.

This invention relates generally to a seal for a double-tube "slip-in-tube" splined driveshaft. The concept of a double-tube "slip-in-tube" splined driveshaft is relatively new. Applicant owns U.S. Pat. No. 6,279,221 ("the '221 patent"), issued Aug. 28, 2001, for a double-tube "slip-in-tube" vehicle driveshaft, which is hereby incorporated in full by reference. A double-tube "slip-in-tube" splined driveshaft comprises first and second members each having splined portions. The second member is telescopically resident within the first member, and the splined portion of the first member cooperates with the splined portion of the second member. In such manner, the first and second members cooperatively form the driveshaft. The cooperating splined portions of the first and second members allows external elements to protrude into the double-tube splined driveshaft at the location of the intermeshing splines.

A sealing system and method for a double-tube "slip-in-tube" splined driveshaft is required to prevent such external elements from getting into the driveshaft at the splined cooperating portions of the driveshaft.

BRIEF SUMMARY OF THE INVENTION

It is in general an object of the invention to provide a sealing system and method to protect a double-tube "slip-in-tube" vehicle driveshaft from premature wear or corrosion.

In one aspect, this invention provides a seal for a driveshaft, wherein the driveshaft comprises first and second members each having splined portions, the second member is telescopically engaged with the first member, and the splined portion of the first member cooperates with the splined portion of the second member thereby allowing the first and second members to cooperatively form the driveshaft. The seal comprises a first splined inner-portion having a first diameter, and a second splined inner-portion having a second diameter. The first diameter of the first splined inner-portion of the seal is larger than the second diameter of the second splined inner-portion of the seal. At least a part of the splined portion of the first member is resident within the first splined inner-portion of the seal. Likewise, at least a part of the splined portion of the second member is telescopically resident within the second splined inner-portion of the seal.

In another aspect, this invention provides a seal for a double-tube splined driveshaft. The seal comprises a first splined inner-portion having a first diameter, and a second splined inner-portion having a second diameter. The first diameter of the first splined inner-portion of the seal is larger than the second diameter of the second splined inner-portion of the seal. The first and second splined inner-portions of the seal are each adapted to be fitted around at least a part of splined portions of separate respective tubes of a double-tube telescopically resident splined driveshaft.

In yet another aspect, this invention provides a method of attaching a seal to a driveshaft. The method comprises providing a driveshaft comprising first and second members each having splined portions. The second member is telescopically resident within the first member. The splined portion of the first member cooperates with the splined portion of the second member thereby allowing the first and second members to cooperatively form the driveshaft. Next, a seal is provided comprising a first splined-inner portion having a first diameter, and a second splined-inner portion having a second diameter. The first diameter of the first splined inner-portion is larger than the second diameter of the second splined inner-portion. Then the first splined inner-portion of the seal is fitted around at least a part of the splined portion of the first member. Finally, the second splined inner-portion of the seal is fitted around at least a part of the splined portion of the second member.

The present invention, together with further objects and advantages, will be best understood by reference to the following detailed description taken in conjunction with the accompanying drawings.

BRIEF DESCRIPTION OF SEVERAL VIEWS OF THE DRAWINGS

FIG. 2 is an assembled side view of the driveshaft shown in FIG. 1;

FIG. 3 is a side view of the driveshaft shown in FIG. 2, taken along view line 3—3;

FIG. 4 is a fragmented perspective view of the portion of the driveshaft which is shown in FIG. 3 and which illustrates portions of the splines, which are used and/or selectively formed upon the vehicle driveshaft of a preferred embodiment;

DETAILED DESCRIPTION OF THE INVENTION

Figure 1:
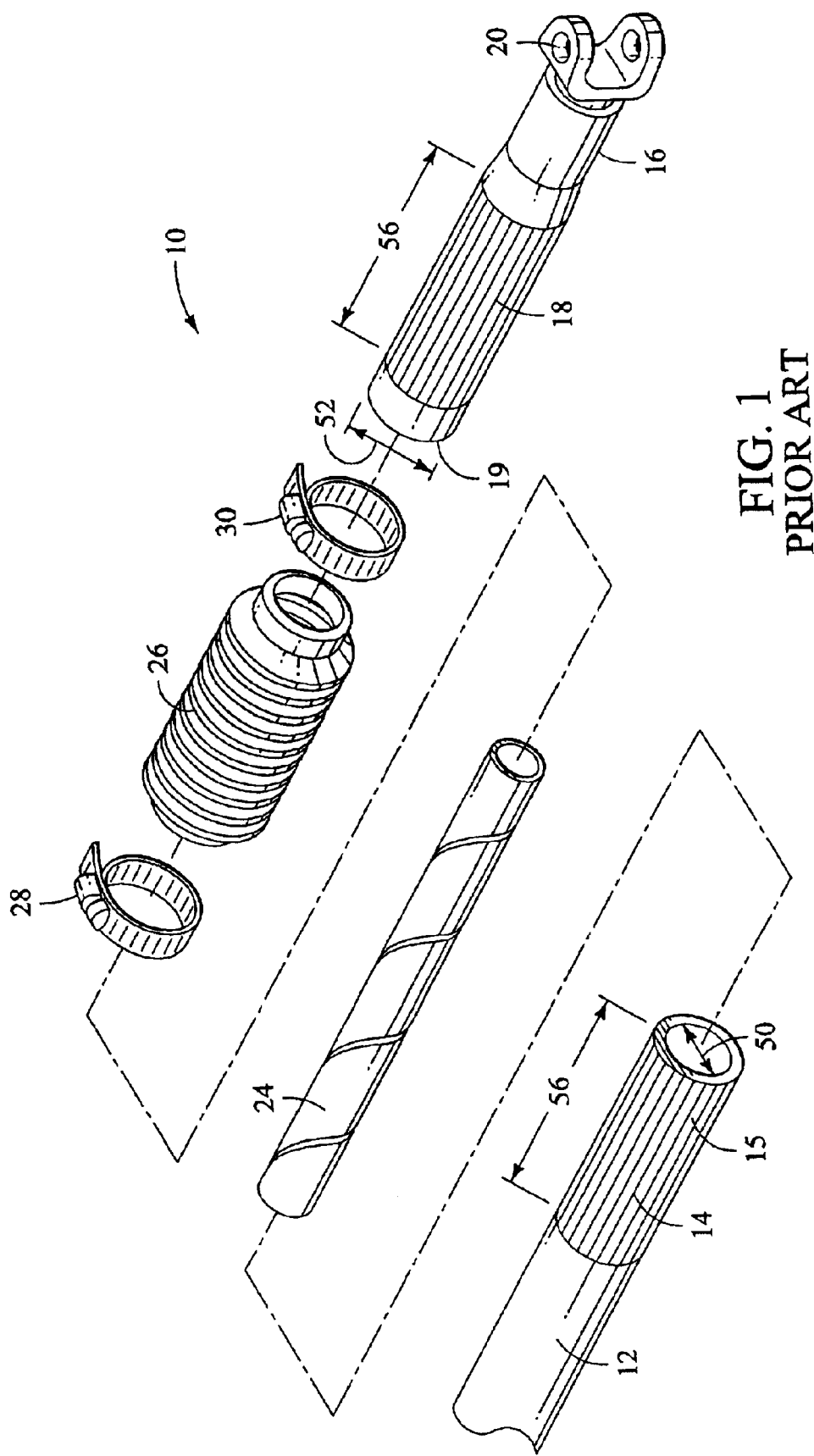
FIG. 1 is an unassembled perspective view of the prior art, for a two-piece slip-in-tube vehicle driveshaft, as shown in the '221 patent.

Applicant owns U.S. Pat. No. 6,279,221 ("the '221 patent"), issued Aug. 28, 2001, for a double-tube "slip-in-tube" vehicle driveshaft, which is hereby incorporated in full by reference.

Referring to the drawings, FIGS. 1–4 have been incorporated from the '221 patent for a double-tube "slip-in-tube"

vehicle driveshaft. As shown, a double-tube "slip-in-tube" vehicle driveshaft 10 includes a generally round and/or tubular, generally hollow first member 16 having a splined portion 18 which is circumferentially formed upon an interior surface 19 of the first member 16. The driveshaft 10 further includes a second generally round and/or tubular, generally hollow member 12 having a splined portion 14 which is circumferentially formed upon an exterior surface 15 of the second member 12. The second member's splined portion 14 is adapted to selectively and cooperatively intermesh with the first member's splined portion 18. The first and second members 16, 12 may have various diameters 52, 50 which in one non-limiting embodiment are respectively equal to about approximately one and three-quarter (1.75) inches to about five (5.0) inches. Other larger diameter values may be utilized.

The second member 12 is adapted to selectively, movably, and telescopically penetrate the first member 16. The splined portions 18, 14 of the first and second members 16, 12 cooperatively intermesh in the usual and known manner. Particularly, the first member 16 is coupled, by the use of a conventional flange 20, to a conventional transmission 21, while the second member 12 is coupled, by the use of a conventional flange 22, to a conventional differential 23. The torque is communicated to the first member 16 and then, by use of the intermeshed splined portions 18, 14 of the first and second members 16, 12, is communicated to the second member 12. The cooperating splined portions 18, 14 allow the second member 12 to dynamically move along the longitudinal axis of symmetry 32 of the driveshaft 10 in response to changes in the distance between the transmission 21 and the differential 23, in a known manner.

The first and second members 16, 12 may be manufactured from conventional and commercially available lightweight aluminum material which may comprise a commercially available "6061-T4" type of aluminum or aluminum alloy material. The splines are "cold formed" upon the surfaces 19, 15 by the use of the conventional "Grob" process which is provided by the Ernst Grob AG company of Mannedorf, Switzerland. Moreover, the splined portions 18, 14 of the first and second members 16, 12 are selectively hardened or "anodized" in accordance with the commercially available Metalast anodizing process which is provided by the Metalast International corporation of Minden, Nev. More particularly, the splined portions 18, 14 of the first and second members 16, 12, in one embodiment, are anodized with a layer of "Metalast hardcoat" material having a thickness of about 0.002".

The use of such anodized aluminum and cold-formed spline portions 18, 14 allows for a relatively lightweight driveshaft 10 which substantially reduces the amount of vibration and noise which emanates from the operatively formed driveshaft 10. The relatively lightweight aluminum construction allows the first and second members 16, 12 to have relatively large diameters 52, 50, while providing a significant decrease in the overall weight relative to prior driveshafts. These relatively large diameters members 16, 12 efficiently distribute the applied axial loads over a larger surface area, thereby allowing the driveshaft 10 to support relatively larger torques at relatively higher speeds than prior driveshaft assemblies. Further, this relatively lightweight design allows for relatively long spline portions 18, 14 which, in one embodiment may have a substantially identical length 56 equal to at least and approximately three times the diameter 52 of the first member 16 (e.g., approximately 13.5 inches). In other non-limiting embodiments, the spline portions 18, 14 have lengths which respectively extend approximately half way along the first and second members 16, 12 or have respective lengths equal to approximately three times their respective diameter. The anodized aluminum splines also, as is best shown in FIGS. 3 and 4, allow for relatively large and/or wide splined mating surfaces and/or "working areas" (e.g., which in one non-limiting embodiment have a "tooth thickness" 42 equal to about five to about ten millimeters). These wide splines allow for better distribution of the axial loads imparted upon the spline portions 18, 14 and are effective to reduce the overall wear of the splines and the assembly 10, thereby substantially increasing the "working" or "operating" life of the driveshaft 10.

In one non-limiting embodiment, each end wall 44, 46 of each spline cooperatively forms an angle 48 of about forty degrees (40°) to eighty degrees (80°), although other angular configurations may be utilized. Further, while a segment of the splined portion 18 of the first member 16 is shown in FIG. 3, it should be realized that the splined portion 14 of the second member 12 is substantially similar. It should be appreciated that these relatively long intermeshing portions 18, 14 reduce the amount of noise and/or vibrations generated from the driveshaft 10. Additionally, these relatively long splined intermeshing portions 18, 14 reduce the probability that the driveshaft 10 will undesirably buckle in a collision, thereby increasing the overall safety of the vehicle. Further, these relatively lightweight first and second members 16, 12 having relatively long respective splined portions 18, 14, allow for the creation of a relative stiff and lightweight driveshaft. In one embodiment, the use of such a driveshaft may replace and/or substantially shorten the elongated transmission extension member 21.

The prior art double-tube "slip-in-tube" vehicle driveshaft 10, as shown in FIGS. 1–4, requires an effective sealing system and sealing method to prevent external elements, such as water, dirt, or salt, from penetrating the driveshaft 10. Such a sealing system and sealing method is particularly required along the splined portions 18, 14 of the first and second members 16, 12 to prevent such external elements from protruding into the driveshaft 10 as the splined portions 18, 14 cooperatively intermesh during compression and decompression plunging motions of the driveshaft 10.

Figure 5:
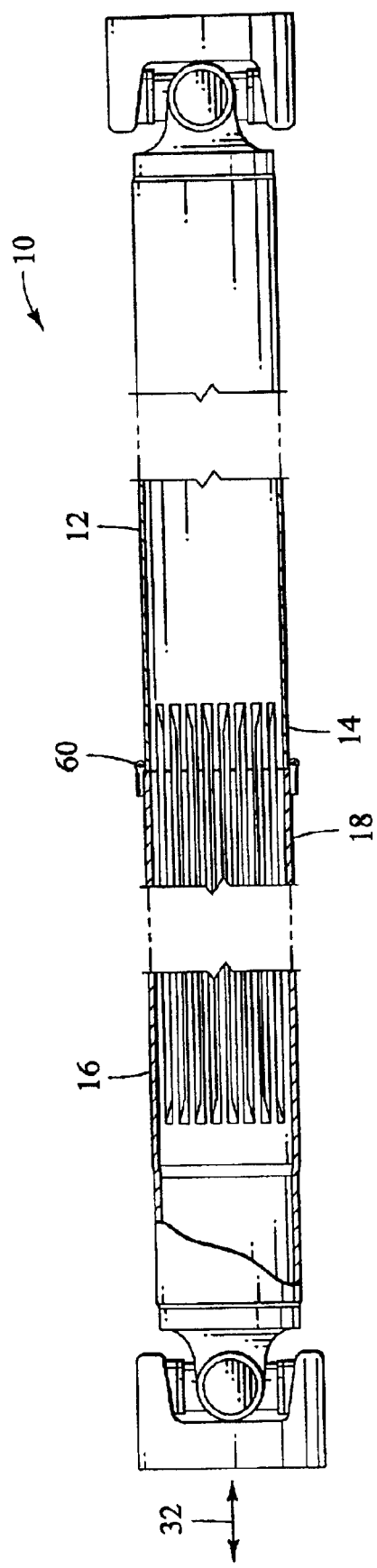
FIG. 5 is an assembled side view of the driveshaft shown in FIG. 1 incorporating one embodiment of the seal of the present invention.
Figure 6:
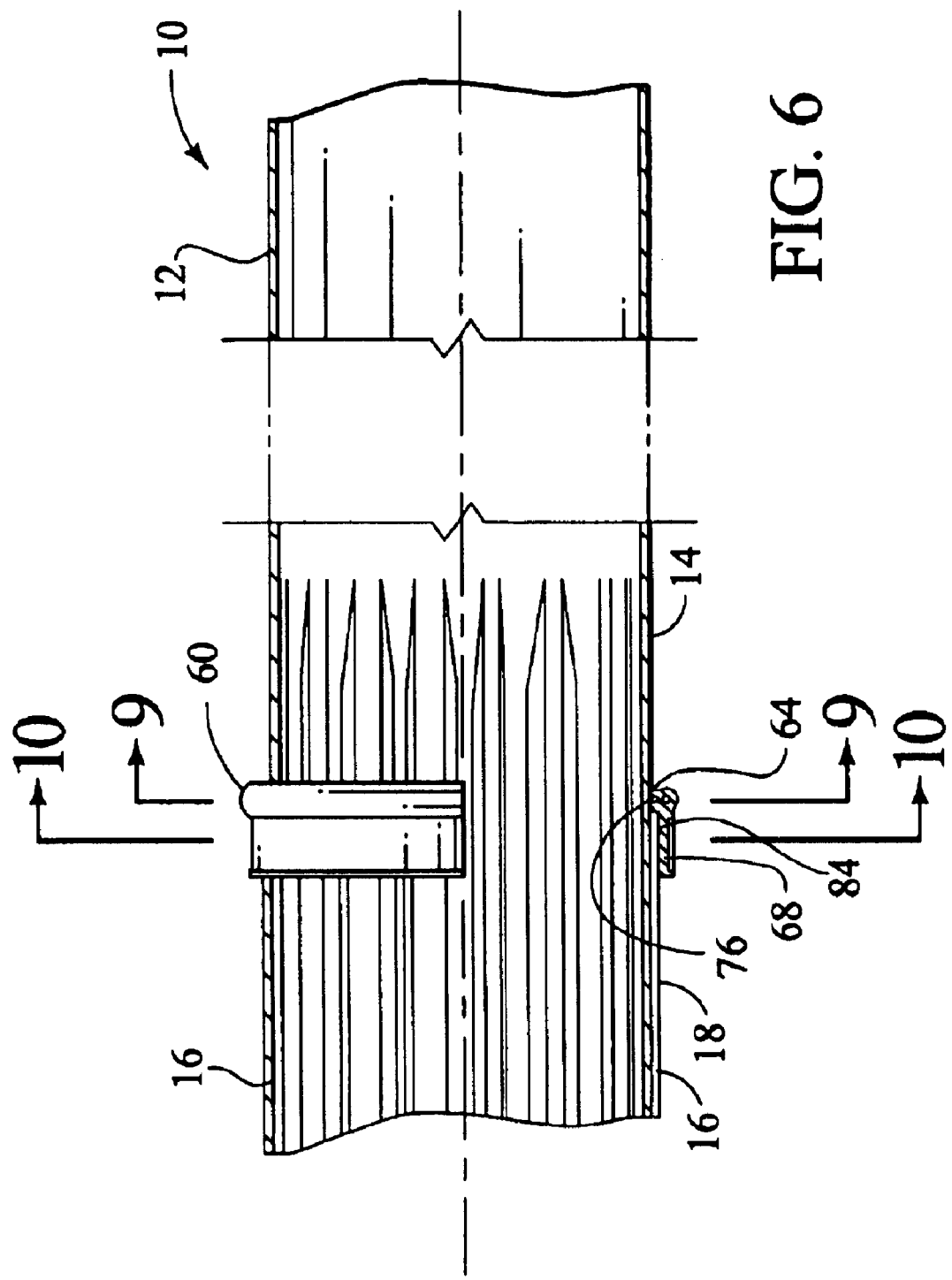
FIG. 6 is an enlarged partial side view of the driveshaft shown in FIG. 1 incorporating one embodiment of the seal of the present invention.

FIGS. 5 and 6 show the seal 60 of the instant invention installed on a double-tube vehicle driveshaft 10 having first and second member 16, 12 with cooperating splined portions 18, 14. The seal 60 is preferably one-piece, and in one embodiment is molded from a relatively soft, compliant plastic ring. In other embodiments, different flexible materials, such as rubber, may be used for the ring.

Figure 8:
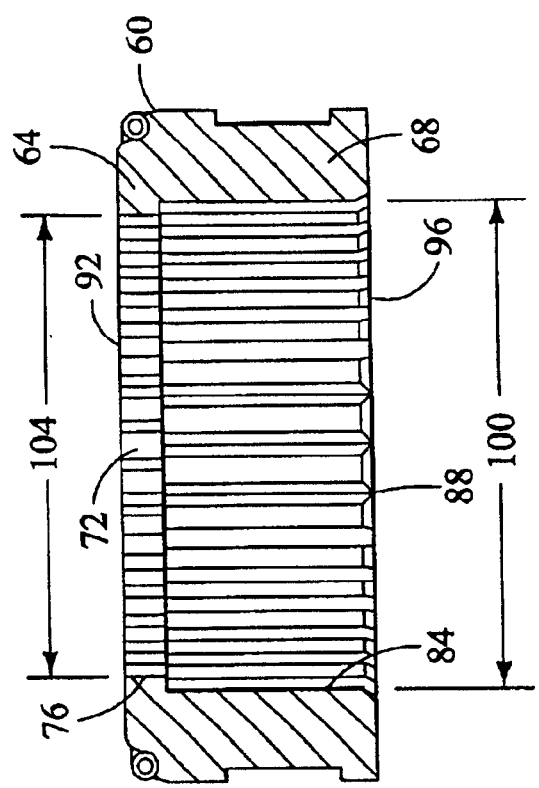
FIG. 8 is a front view of the seal of FIG. 7.
Figure 7:
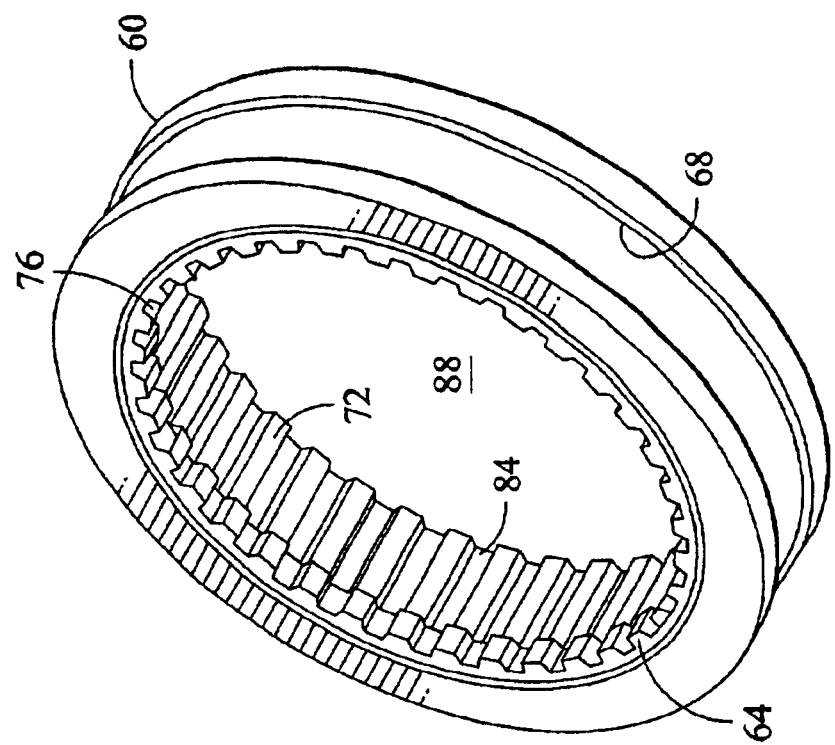
FIG. 7. is a perspective view of one embodiment of the seal of the present invention.
Figure 9:
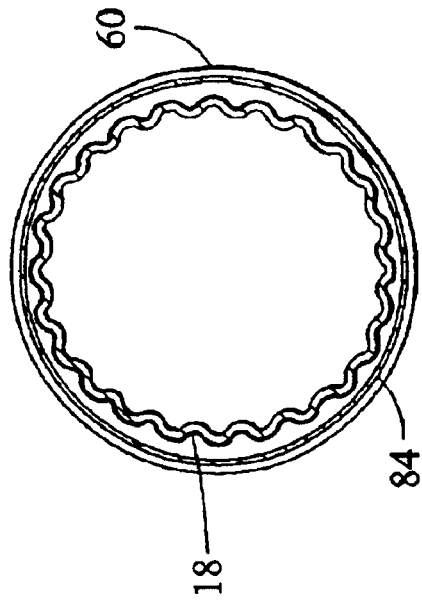
FIG. 9 is a cut-away side view of the embodiment of FIG. 6, taken along view line 9—9.
Figure 10:
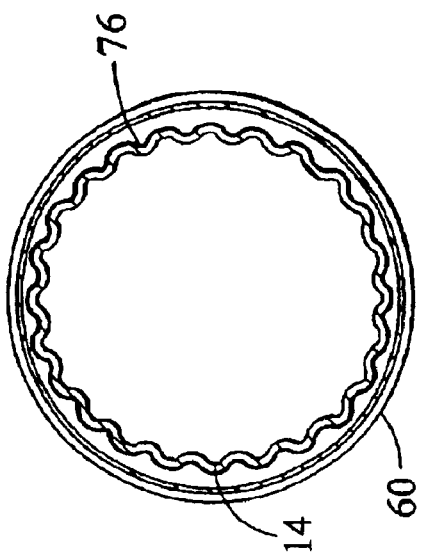
FIG. 10 is a cut-away side view of the embodiment of FIG. 6, taken along view line 10—10.
Figure 11:
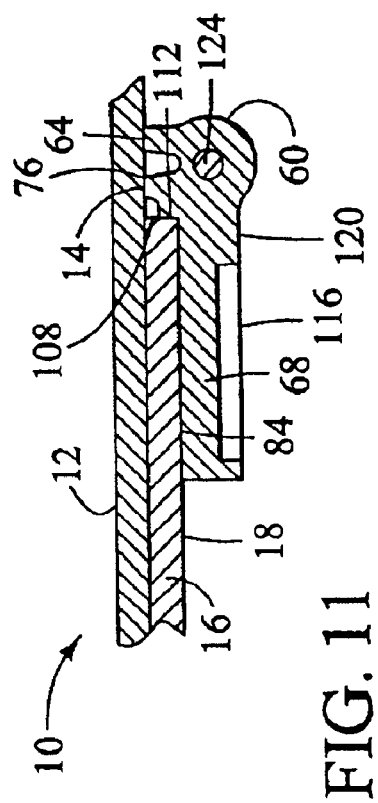
FIG. 11 is an enlarged cut-away side view of the embodiment of FIG. 6, showing the attachment of the seal to the first and second members of the driveshaft, taken at one point of the seal.

Perspective and cut-away views of the seal 60 are shown in FIGS. 7 and 8. The seal 60 is preferably generally cylindrical and has a top portion 64 and a bottom portion 68. A generally cylindrical splined inner surface 76 of the top portion 64 defines an axially extending generally cylindrical opening 72 extending throughout the length of the top portion 64 of the seal 60. Likewise, a generally cylindrical splined inner surface 84 of the bottom portion 68 defines an axially extending generally cylindrical opening 88 extending throughout the length of the bottom portion 68 of the seal 60. The opening 72 defined by the splined inner surface 76 of the top portion 64 communicates with the opening 88 defined by the splined inner surface 84 of the bottom portion 68, thereby extending continuously from the top of the seal 92 to the bottom of the seal 96. The diameter 100 of the splined inner surface 84 of the bottom portion 68 is preferably greater than the diameter 104 of the splined inner surface 76 of the top portion 64. The splined portions are preferably defined by inwardly-projecting splines extending in the axial direction along the inner surface of the seal.

In operation, as shown in FIGS. 6, 9, 10, and 11, in a preferred embodiment the first member 16 of the driveshaft 10 is resident, in an air-tight fashion, within the bottom portion 68 of the seal 60. An end 108 of the first member 16 preferably abuts against a lower radially extending end 112 of the top portion 64 of the seal 60. The splined inner surface 84 of the bottom portion 68 of the seal 60 intermeshes in the usual and known manner with the splined portion 18 of the first member 16. Further, the second member 12 of the driveshaft 10 is preferably air-tightly telescopically resident within the top portion 64 of the seal 60. The splined inner surface 76 of the top portion 64 of the seal 60 cooperatively intermeshes with the splined portion 14 of the second member 12.

The splined inner surface 84 of the bottom portion 68 of the seal 60 is preferably conformed to the splined portion 18 of the first member 16 with some initial preload force. After the end 108 of the first member 16 abuts against the lower radially extending end 112 of the top portion 64 of the seal 60, the first member 16 is preferably locked in place within the bottom portion 68 of the seal 60 utilizing a clamp 116. The clamp 116 may be applied at least partly around an exterior surface 120 of the bottom portion 68 of the seal 60. In other embodiments, other locking mechanisms may be utilized such as springs or snap-fits.

Similarly, the splined inner surface 76 of the top portion 64 of the seal 60 preferably conforms to the splined portion 14 of the second member 12 with some initial preload force. A spring 124 may be molded within the top portion 64 of the seal to provide preload force against the splined portion 14 of the second member 12. The spring 124 may be a garter ring. In other embodiments, other mechanisms such as a clamp may be utilized to provide preload force. In a preferred embodiment, the second member 12 is adapted to selectively, movably, and telescopically move within the top portion 64 of the seal 60 as the splined portions 18, 14 of the first and second members 16, 12 cooperatively intermesh during compression and decompression plunging motions of the driveshaft 10.

Figure 12:
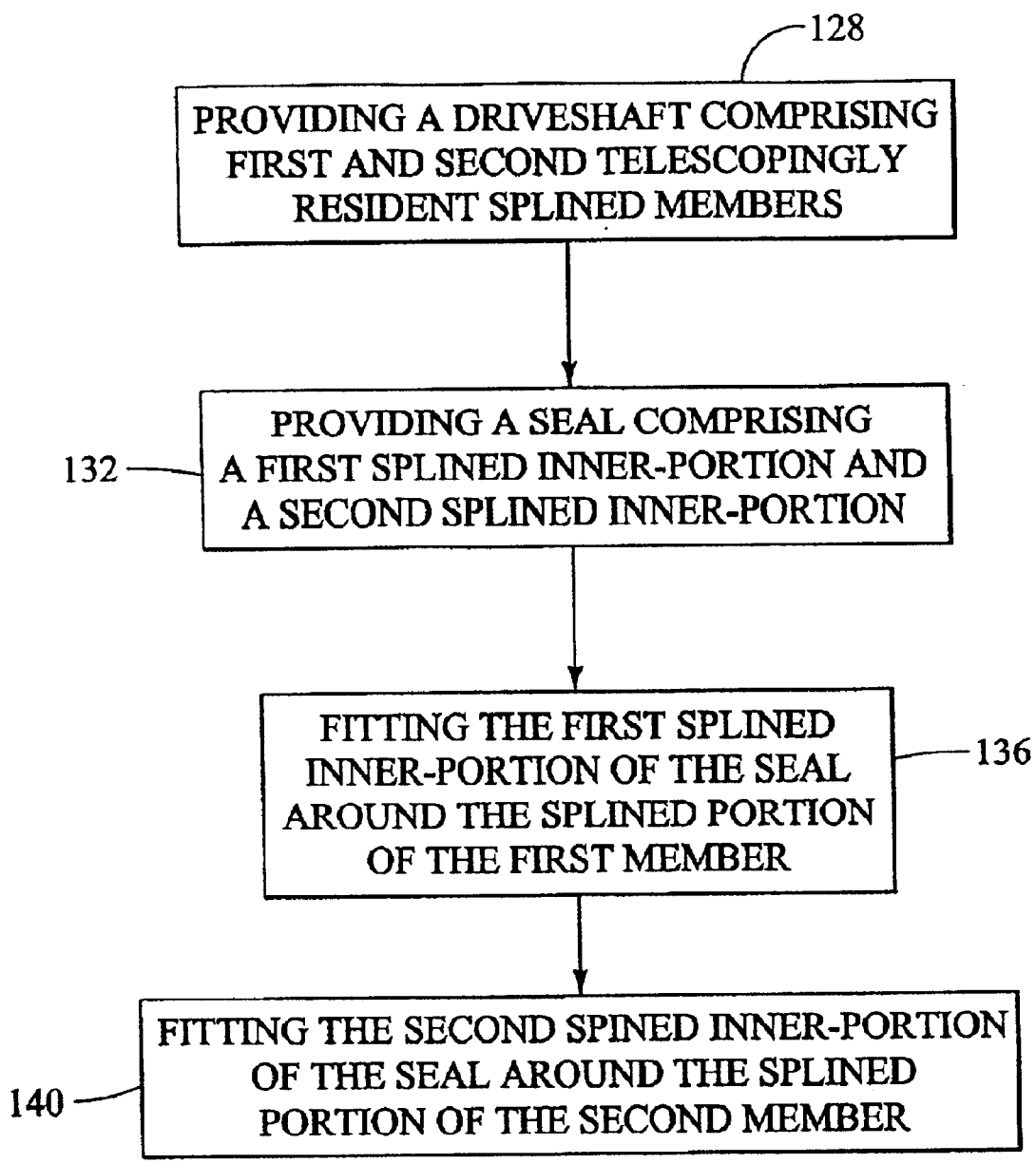
FIG. 12 is a flow diagram illustrating one exemplary method in accordance with the present invention.

FIG. 12 shows a method of installing a seal on a double-tube "slip-in-tube" vehicle driveshaft. First, a driveshaft is provided 128 comprising first and second members, each having splined portions, the second member being telescopically resident within the first member, and the splined portion of the first member cooperating with the splined portion of the second member. In such manner, the first and second members cooperatively form the driveshaft. Next, a seal is provided 132 comprising a first splined-inner portion having a first diameter, and a second splined-inner portion having a second diameter. The diameter of the first splined inner-portion is larger in value than the diameter of the second splined inner-portion. The first splined inner-portion of the seal is then fitted 136 around at least a part of the splined portion of the first member. Finally, the second splined inner-portion of the seal is fitted 140 around at least a part of the splined portion of the second member. During installation, preload force may be applied to secure the seal to the driveshaft. Such preload force may be applied by utilizing a number of mechanisms including a snugly fit seal, or a spring. A further step may include clamping the seal to the driveshaft.

It is to be understood that the invention is not to be limited to the exact construction and/or method which has been illustrated and discussed above, but that various changes and/or modifications may be made without departing from the spirit and the scope of the invention.

What is claimed is:

1. A seal for a double-tube splined shaft, said seal comprising:
    a first splined inner-portion having a first diameter;
    a second splined inner-portion having a second diameter, wherein said first and second splined inner-portions of said seal are each adapted to be slidably fitted around at least a part of splined portions of separate respective tubes of a double-tube telescopically resident splined shaft; and
    a spring disposed within said seal proximate to the first splined inner-portion,
    wherein said seal is molded from a relatively soft, compliant material such that the spring resiliently biases the first splined inner-portion radially inwardly for engagement with the splined portions of the shaft.

2. The seal of claim 1 wherein said seal is one-piece.

3. The seal of claim 1 wherein said seal is plastic.

4. The seal of claim 1 further comprising a clamp secured around one of said first and second splined inner-portions of said seal.

5. The seal of claim 1 wherein said first and second splined inner-portions of said seal are generally cylindrical.

6. A seal for double-tube splined shaft, said seal comprising:
    a first splined inner-portion having a first diameter;
    a second splined inner-portion having a second diameter, wherein said first and second splined inner-portions of said seal are each adapted to be slidably fitted around at least a part of splined portions of separate respective tubes of a double-tube telescopically resident splined shaft; and
    a spring disposed within said seal proximate to the first splined inner-portion, wherein said seal is molded from a relatively soft, compliant material such that the spring resiliently biases the first splined inner-portion radially inwardly for engagement with the splined portions shaft, and wherein said first splined inner-portion and said second splined inner-portion include inwardly-projecting splined extending in the axial direction of said seal.

7. A driveshaft comprising:
    a shaft including first and second members each having splined portions and end portions, said second member being telescopically resident within said first member, said splined portion of said first member cooperating with said splined portion of said second member thereby allowing said first and second members to cooperatively form the shaft;
    a seal molded from a relatively soft, compliant material, said seal including an outer surface, an inner surface, a bottom portion, and a top portion, wherein said inner surface includes a first splined inner-portion, a second splined inner-portion, and an intermediate section, wherein said first splined inner-portion and said second splined inner-portion are substantially parallel with each other;
    wherein said first splined inner-portion is located proximal to said bottom portion and adapted to couple with said first member splined portion, said second splined inner-portion is located proximal to said top portion and adapted to couple with said second member splined portion, and said intermediate section is located in between said first splined inner-portion and said second splined inner-portion and a spring molded within said first splined inner-portion of said seal, wherein said spring resiliently radially biases said first splined inner-portion of said seal into engagement with said splined portion of said first member.

8. The driveshaft of claim 7 wherein said seal is one-piece.

9. The driveshaft of claim 7 wherein said seal is plastic.

10. The driveshaft of claim 7 wherein each of said first and second members have respective diameters of approximately a same respective value, and each of said first and second members respective splined portions have a respective length of about three times said value of said respective diameter of said first member.

11. The driveshaft of claim 7 wherein said first and second splined inner-portions of said seal are fit around at least part of the respective splined portions of said first and second members utilizing initial preload force.

12. The driveshaft of claim 7 wherein said spring is a garter-ring.

13. The driveshaft of claim 7 wherein said first splined inner-portion of said seal is air-tightly fit around at least a part of the splined portion of said first member, and the second splined inner-portion of said seal is air-tightly fit around at least a part of the splined portion of said second member.

14. The driveshaft of claim 7 wherein said first and second members of said shaft and said first and second splined inner-portions of said seal are generally cylindrical.

15. The driveshaft of claim 7 wherein said first member is adapted to couple with a transmission of the vehicle, and said second member is adapted to couple with a differential of the vehicle.

16. The driveshaft of claim 7 wherein said second splined inner-portion is defined by an annular lip, said annular lip located substantially proximal to an axial end of said seal.

17. The driveshaft of claim 16 wherein said annular lip is adjacent to said first member.

18. A driveshaft comprising:

a shaft including first and second members each having splined portions and end portions, said second member being telescopically resident within said first member, said splined portion of said first member cooperating with said splined portion of said second member thereby allowing said first and second members to a seal molded from a relatively soft, compliant material, said seal including an outer surface, an inner surface, a bottom portion, and a top portion wherein said inner surface includes a first splined inner-portion, a second spline inner-portion, and an intermediate section, said first splined inner-portion and said second splined inner-portion are substantially parallel with each other, said first splined inner-portion is located proximal to said bottom portion and adapted to couple with said first member splined portion, said second splined inner-portion is located proximal to said top portion and adapted to couple with said second member splined portion, said intermediate section is located in between said first splined inner-portion and said second splined inner-portion and adapted to couple with said first member end portion, and said first splined inner-portion and said second splined inner-portion include inwardly-projecting splines extending in the axial direction along said inner surface of said seal; and a spring molded within said first splined inner-portion of said seal, wherein said spring resiliently radially biases said first splined inner-portion of said seal into engagement with said splined portion of said first member.

19. The seal of claim 1 wherein said first diameter of said first splined inner-portion of said seal is larger than said second diameter of said second splined inner-portion of said seal.

* * * * *

UNITED STATES PATENT AND TRADEMARK OFFICE
CERTIFICATE OF CORRECTION

PATENT NO. : 6,802,780 B2
DATED : October 12, 2004
INVENTOR(S) : Maciej Glowacki et al.

It is certified that error appears in the above-identified patent and that said Letters Patent is hereby corrected as shown below:

Column 7,
Line 58, after "inner-portion and" insert -- adapted to couple with said first member end portion; and --.

Column 8,
Line 9, after "second members to" insert -- cooperatively form the shaft; --.

Signed and Sealed this

Nineteenth Day of April, 2005

JON W. DUDAS
*Director of the United States Patent and Trademark Office*